(12) United States Patent
Hatano

(10) Patent No.: US 11,657,221 B2
(45) Date of Patent: May 23, 2023

(54) DISPLAY EDITING APPARATUS, SERVER APPARATUS, DISPLAY EDITING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Yoshiaki Hatano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 527 days.

(21) Appl. No.: 16/354,228

(22) Filed: Mar. 15, 2019

(65) Prior Publication Data

US 2019/0332655 A1 Oct. 31, 2019

(30) Foreign Application Priority Data

Apr. 27, 2018 (JP) .............................. JP2018-087010

(51) Int. Cl.
| | |
|---|---|
| *G06F 40/197* | (2020.01) |
| *G06F 3/0481* | (2022.01) |
| *H04L 67/1095* | (2022.01) |
| *G06F 40/106* | (2020.01) |
| *G06F 40/166* | (2020.01) |

(Continued)

(52) U.S. Cl.
CPC .......... *G06F 40/197* (2020.01); *G06F 3/0481* (2013.01); *G06F 3/0484* (2013.01); *G06F 3/04845* (2013.01); *G06F 40/106* (2020.01); *G06F 40/166* (2020.01); *H04L 67/1095* (2013.01); *G06F 2203/04804* (2013.01)

(58) Field of Classification Search
CPC .. G06F 3/0481; G06F 3/0484; G06F 3/04845; G06F 40/106; G06F 40/166; G06F 40/197; G06Q 10/103; H04L 67/1095
See application file for complete search history.

(56) References Cited

U.S. PATENT DOCUMENTS 8,566,729 B2 10/2013 Komine et al.
2004/0217947 A1* 11/2004 Fitzmaurice .......... G06F 3/0481
345/181

(Continued)

FOREIGN PATENT DOCUMENTS

JP 2001188778 7/2001
JP 2010086083 4/2010

(Continued)

OTHER PUBLICATIONS

"Office Action of Japan Counterpart Application" with English translation thereof, dated May 10, 2022, p. 1-p. 6.

*Primary Examiner* — Seth A Silverman
(74) *Attorney, Agent, or Firm* — JCIPRNET

(57) ABSTRACT

A display editing apparatus includes a reception unit that receives a first editing layer with transparency including data to be edited, and a second editing layer with transparency including the data to be edited which is edited by a second user; a first editing unit that edits the data to be edited included in the first editing layer, based on an operation of a first user; and a display control unit that performs control such that a layer, selected from the first editing layer and the second editing layer, is superimposed and displayed on a front side of an original layer including original data to be edited before editing.

17 Claims, 10 Drawing Sheets

(51) Int. Cl.
*G06F 3/04845* (2022.01)
*G06F 3/0484* (2022.01)

(56) References Cited

U.S. PATENT DOCUMENTS

| | | | |
|---|---|---|---|
| 2010/0313252 A1* | 12/2010 | Trouw | G06Q 30/0222 |
| | | | 715/760 |
| 2012/0101980 A1 | 4/2012 | Taleghani et al. | |
| 2012/0254778 A1* | 10/2012 | Svendsen | H04N 21/222 |
| | | | 715/763 |
| 2013/0191451 A1 | 7/2013 | Tse et al. | |
| 2016/0125628 A1* | 5/2016 | Barnes | G06T 17/05 |
| | | | 345/440 |
| 2017/0131855 A1* | 5/2017 | Svendsen | H04N 5/76 |

FOREIGN PATENT DOCUMENTS

| | | |
|---|---|---|
| JP | 2012033095 | 2/2012 |
| JP | 2012247831 | 12/2012 |
| JP | 2013541115 | 11/2013 |
| JP | 2015513713 | 5/2015 |
| JP | 2016517051 | 6/2016 |
| JP | 2017204180 | 11/2017 |

* cited by examiner

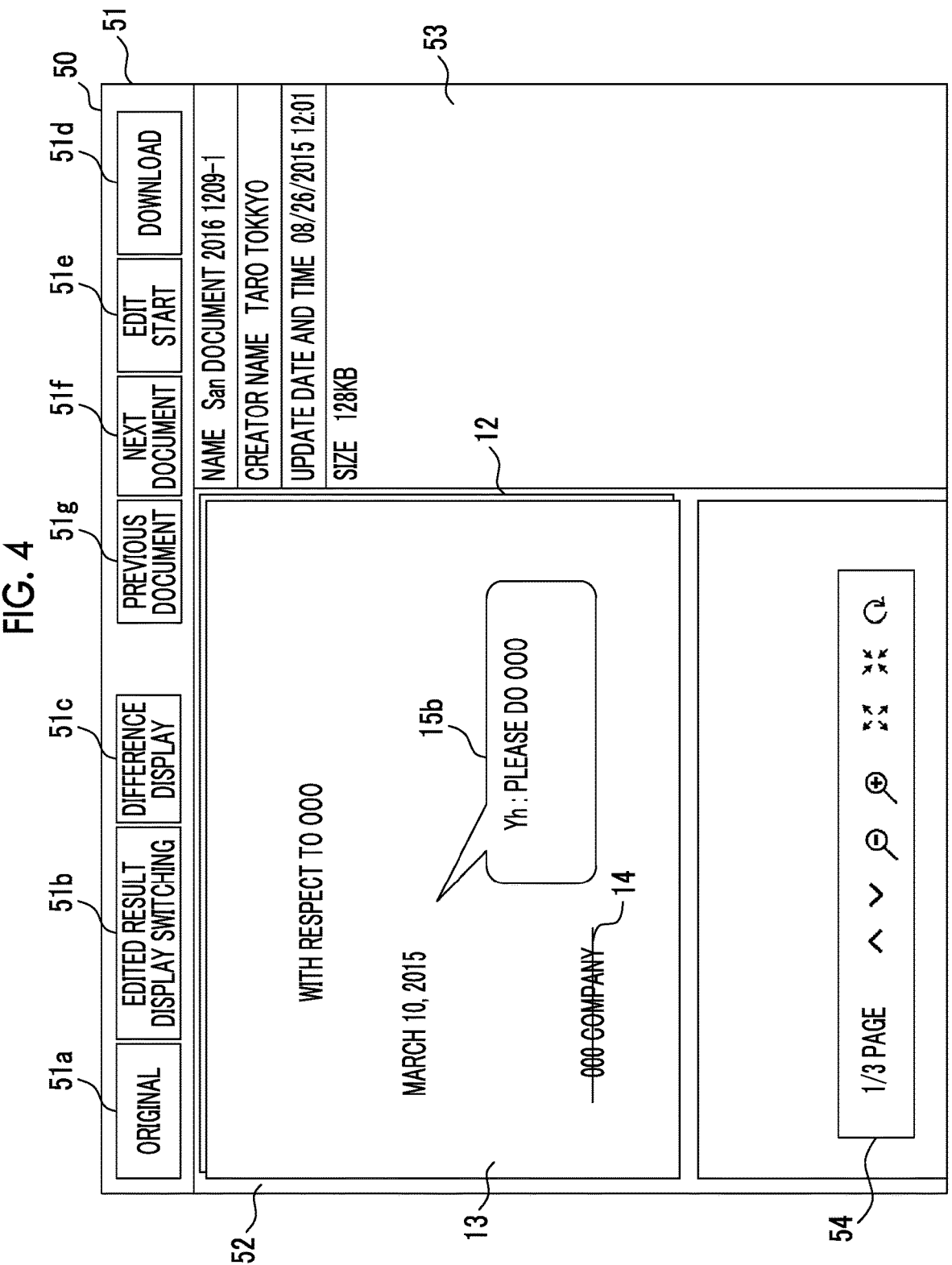

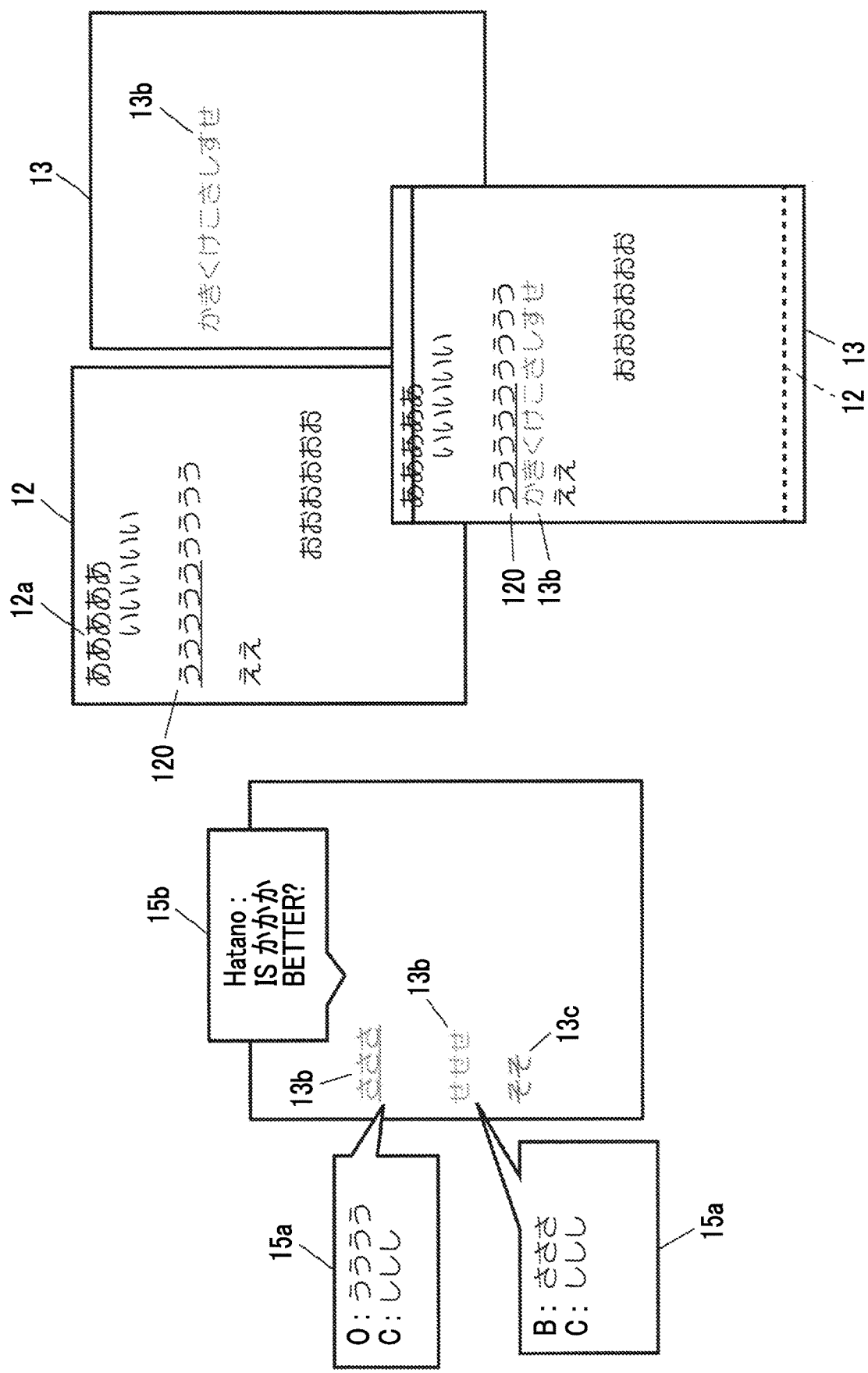

DISPLAY EDITING APPARATUS, SERVER APPARATUS, DISPLAY EDITING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-087010 filed Apr. 27, 2018.

BACKGROUND

(i) Technical Field

The present invention relates to a display editing apparatus, a server apparatus, a display editing system, and a non-transitory computer readable medium storing a program.

(ii) Related Art

In recent years, an information processing apparatus has been proposed in which plural users are able to collaboratively edit one document (for example, see JP2017-204180A).

The information processing apparatus described in JP2017-204180A includes a first presentation unit that encourages a second user to record purpose of editing, before the second user is not able to edit a document, in a case where a first user is not able to edit the document and a second user edits the document.

SUMMARY

Aspects of non-limiting embodiments of the present disclosure relate to a display editing apparatus, a server apparatus, a display editing system, and a non-transitory computer readable medium storing a program, which are capable of editing same part at the same time in a case where plural people edit a document stored in a server apparatus online at the same time.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display editing apparatus including a reception unit that receives a first editing layer with transparency including data to be edited, and a second editing layer with transparency including the data to be edited which is edited by a second user; a first editing unit that edits the data to be edited included in the first editing layer, based on an operation of a first user; and a display control unit that performs control such that a layer, selected from the first editing layer and the second editing layer, is superimposed and displayed on a front side of an original layer including original data to be edited before editing.

BRIEF DESCRIPTION OF THE DRAWINGS

Exemplary embodiment(s) of the present invention will be described in detail based on the following figures, wherein:

FIG. 4 is a diagram illustrating an example of a work screen;

FIGS. 6A and 6B are diagrams illustrating Display Example 2 in which an editing layer is superimposed on the original layer illustrated in FIG. 5A;

DETAILED DESCRIPTION

Figure 1:
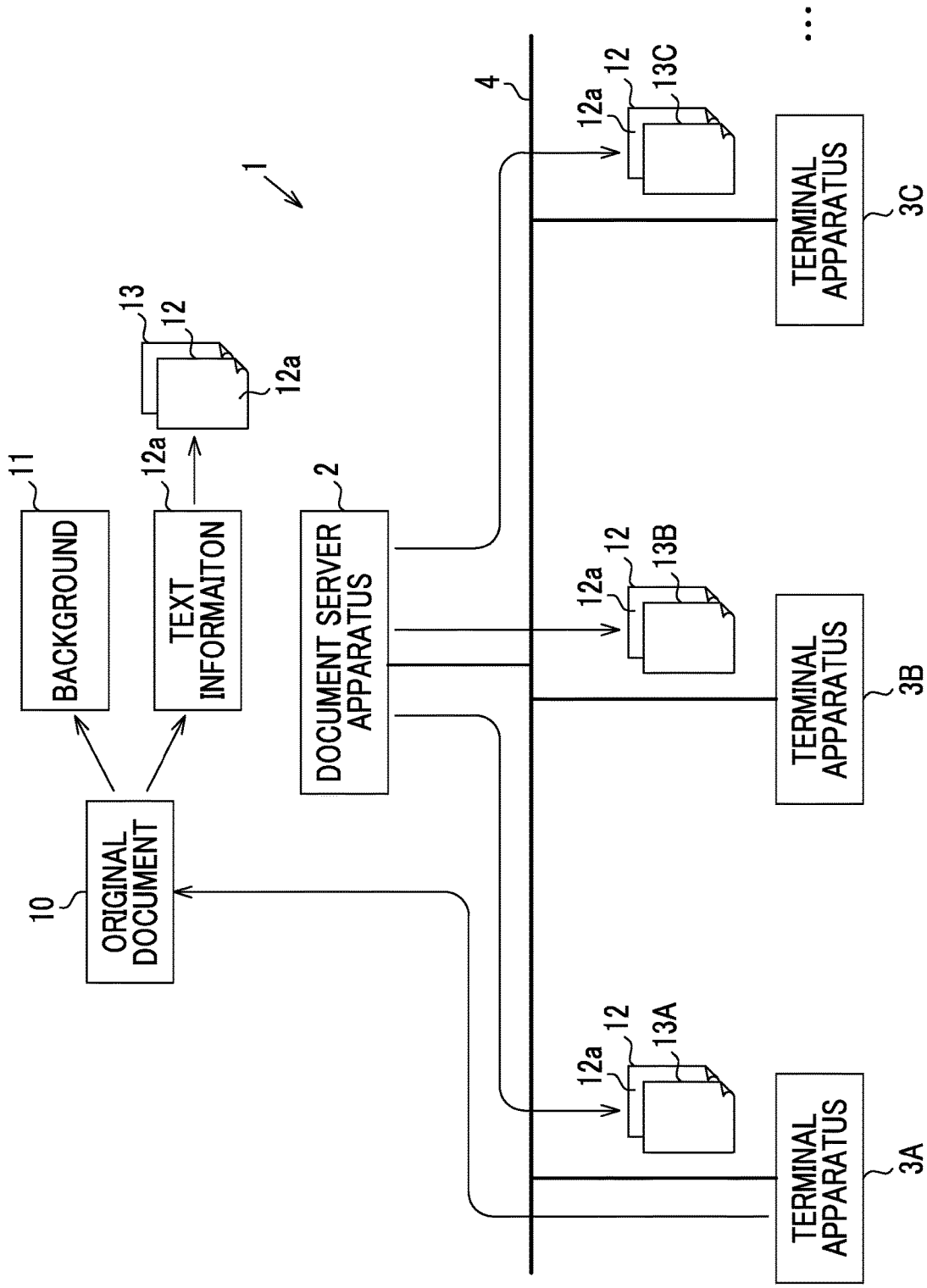
FIG. 1 is a block diagram illustrating an example of a display editing system according to an exemplary embodiment of the present invention.

Hereinafter, exemplary embodiments of the present invention will be described with reference to the drawings. In the drawings, the same reference numerals are attached to the constituent elements having substantially the same function, and duplicated explanations are omitted.

Summary of Exemplary Embodiment

A display editing apparatus according to an exemplary embodiment of the present invention includes a reception unit that receives a first editing layer with transparency including data to be edited, and a second editing layer with transparency including the data to be edited which is edited by a second user; a first editing unit that edits the data to be edited included in the first editing layer, based on an operation of a first user; and a display control unit that performs control such that a layer, selected from the first editing layer and the second editing layer, is superimposed and displayed on a front side of an original layer including original data to be edited before editing.

The data to be edited is, for example, data including text of WORD (registered trademark), EXCEL (registered trademark) or the like (hereinafter also referred to as "text information"), data including text extracted by performing optical character recognition (OCR) on a character part of image data of JPEG, TIFF, DocuWorks (registered trademark), and original data for image data other than the character part of image data. The text information includes text and attribute information (color, underline, font, size, or the like), but the page attribute may be removed from the attribute information.

Exemplary Embodiment

FIG. 1 is a block diagram illustrating an example of a display editing system according to an exemplary embodiment of the present invention.

The display editing system 1 includes a document server apparatus 2 that manages documents, and plural terminal apparatuses 3, 3B, 3C, . . . (also referred to as "terminal apparatus 3" when being collectively referred) used by users to create and edit a document. The document server apparatus 2 and the plural terminal apparatuses 3 are connected to each other by a network 4. Hereinafter, the user who creates a document is referred to as "creator", and the user who edits the document is also referred to as "editor". In addition, a creator may also be an editor. The terminal apparatus 3 is an example of a display editing apparatus. The creator is an example of a third user. The editor is an example of a first user and a second user.

The terminal apparatus 3 may be, for example, a personal computer (PC), a tablet terminal, a multifunctional mobile phone (smartphone), or the like.

The network 4 is, for example, a communication network such as a local area network (LAN), a wide area network (WAN), and the Internet, in which data is transmitted and received through wired communication or wireless communication.

Configuration Document Server Apparatus

Figure 2:
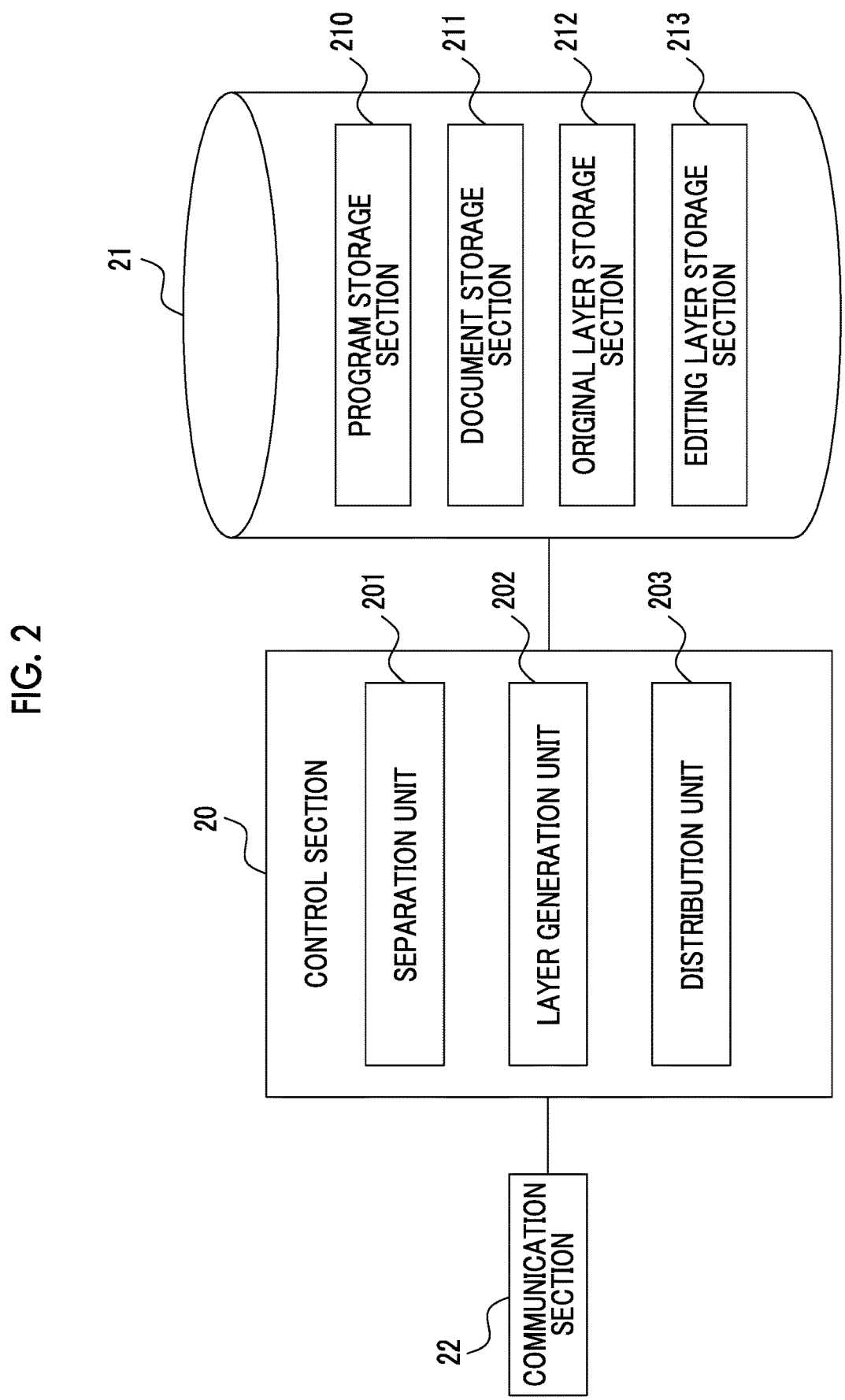
FIG. 2 is a block diagram illustrating an example of a control system of a document server apparatus.

FIG. 2 is a block diagram illustrating an example of a control system of the document server apparatus 2. The document server apparatus 2 includes a control section 20, a storage section 21, and a communication section 22.

The control section 20 includes a central processing unit (CPU), an interface, and the like. The CPU functions as a separation unit 201, a layer generation unit 202, a distribution unit 203, and the like by operating in accordance with the program stored in the storage section 21. The separation unit 201 is an example of an extraction unit.

The storage section 21 is configured with a read only memory (ROM), a random access memory (RAM), a hard disk, or the like, and includes a program storage section 210 that stores a program, a document storage section 211 that stores an original document 10, an original layer storage section 212 that stores an original layer 12, and an editing layer storage section 213 that stores plural editing layers 13A, 13B, and 13C (hereinafter also referred to as "editing layer 13" when being collectively referred) with transparency. The original layer 12 includes text information 12a which is separated from the original document 10. The text information 12a includes text and attribute information (color, underline, font, size, or the like). The text information 12a is an example of original data to be edited before editing.

The document storage section 211 includes a document ID for identifying a document, a user ID for identifying the user who creates the document, management information such as the date and time when the document is created, and document data corresponding to management information.

The communication section 22 transmits and receives information to and from external apparatuses such as the terminal apparatus 3 through the network 4.

The separation unit 201 separates the original document 10, that has been requested for editing, into a background image 11 and text information 12a. In a case where the original document 10 is image data, the separation unit 201 performs OCR on the character part of the image data to extract text information 12a.

The layer generation unit 202 generates an original layer 12 including the text information 12a and an editing layer 13 with transparency not including the text information 12a. In the case of generating the original layer 12 and the editing layer 13, the layer generation unit 202 gives authority to the original layer 12 and the editing layer 13. Specifically, with respect to the original layer 12, the layer generation unit 202 gives the authority of editing only to the creator and gives the authority of copying and viewing to persons other than the creator. With respect to the editing layer 13, the authority of editing is given only to one editor and the authority of copying and viewing is given to other editors. Further, with respect to the original layer 12, the authority of editing may also be given to certain editors such as superiors.

The distribution unit 203 transmits and distributes the original layer 12 and the editing layer 13 to the terminal apparatus 3 of the creator of the document and a terminal apparatus 3 designated as an editing request destination. Further, in a case where the editing layer 13 which has been edited is transmitted from the terminal apparatus 3, the distribution unit 203 transmits the editing layer 13 to the terminal apparatuses 3 of the creator and other editing request destinations.

Figure 3:
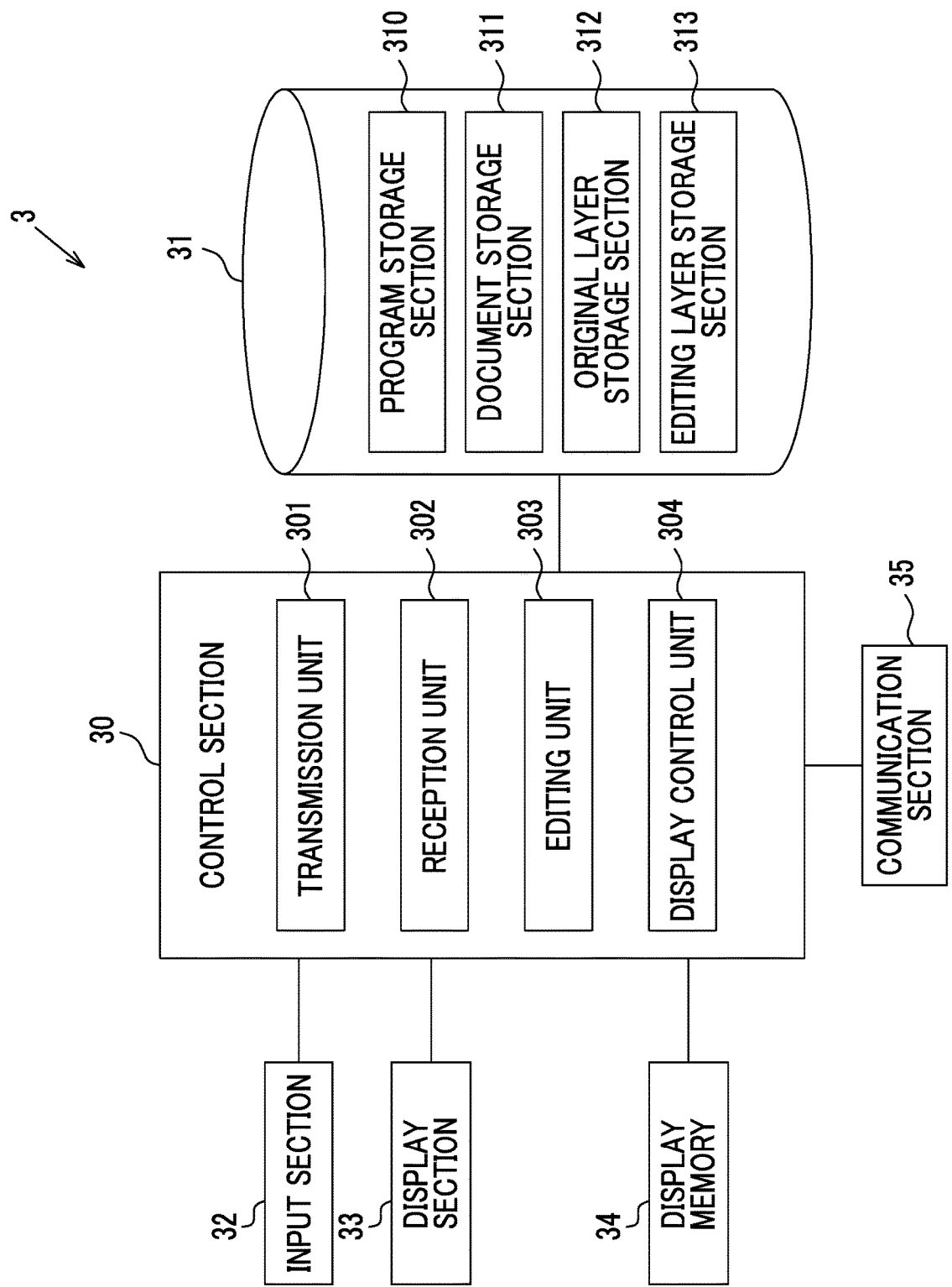
FIG. 3 is a block diagram illustrating an example of a control system of a terminal apparatus.

FIG. 3 is a block diagram illustrating an example of a control system of the terminal apparatus 3. The terminal apparatus 3 includes a control section 30 that controls the sections of terminal apparatus 3, a storage section 31 that stores various types of information such as programs and data, an input section 32 that inputs information, such as a keyboard and a mouse, a display section 33 that displays information, such as a liquid crystal display, a display memory 34 that stores a layer or the like to be displayed on the display section 33, and a communication section 35 that is connected to the network 4 and transmits and receives information to and from external apparatuses such as the document server apparatus 2.

The control section 30 includes a central processing unit (CPU), an interface, and the like. The CPU functions as a transmission unit 301, a reception unit 302, an editing unit 303, a display control unit 304, and the like by operating in accordance with the program stored in the storage section 31.

The storage section 31 is configured with a read only memory (ROM), a random access memory (RAM), a hard disk, and the like, and includes a program storage section 310 that stores a program, a document storage section 311 that stores the original document 10 downloaded from the document server apparatus 2 or the original document 10 under construction, an original layer storage section 312 that stores the original layer 12, and an editing layer storage section 313 that stores editing layers 13 with transparency.

The transmission unit 301 transmits the original document 10, the original layer 12, the editing layer 13, or the like, which are designated by the user's operation, to the document server apparatus 2.

The reception unit 302 receives the original layer 12, the editing layer 13, or the like, transmitted from the document server apparatus 2.

The editing unit 303 describes the edited content on the editing layer 13 by the user operating the input section 32. In this case, candidate notation, color coding notation, comment notation, proofreading notation, or the like may be performed. "Candidate notation" is to describe edited contents which are not superimposed and displayed as a candidate in the balloon, in a case where the edited part of the user overlaps the edited part of another editor. "Color coding notation" is to describe edited contents with different colors for each editor. "Comment notation" is to describe a comment in a balloon, in a case where a comment is added to an edited part. "Proofreading notation" is to describe marks such as deletion and insertion on the editing layer. In addition, the display mode for identifying the editor is not limited to color coding notation, and other methods using font or the like may be used. The balloon is an example of a speech bubble form.

Further, in a case of editing the text information 12a, even in a case where the edited part goes to a next page, the editing unit 303 may edit it such that the edited content is retained on the page.

Based on the user's operation on the work screen 50, the display control unit 304 controls various processes, for example, changing the mode between a preview mode and an edit mode, or displaying the editing layer 13 selected on the front side of the original layer 12 so as to be superimposed.

The mode of displaying the editing layer 13 so as to be superimposed on the front side of the original layer 12 includes the following modes. These display modes are selected by, for example, a user, and are executed by the display control unit 304. In the following editing layer 13, one person may have plural editing layers 13 due to being copied by the user or being given from the document server apparatus 2.

(a) Superimposed display of all editing layers 13
(b) Superimposed display of editing layer 13 of the user
(c) Superimposed display of all or a part of the editing layers 13 of other people
(d) Difference display of a difference between the original layer 12 and the selected editing layer 13
(e) Comparison display such that comparison is possible between the original layer 12 and the selected editing layer 13 or between selected plural editing layers 13

FIG. 4 is a diagram illustrating an example of a work screen displayed by the display section 33 of the terminal apparatus 3. The work screen 50 illustrated FIG. 4 includes a tool bar 51 provided at the top, a document display area 52 for displaying a document or the like on the left side, an attribute information display area 53 for displaying attribute information or the like of the document displayed on the document display area 52, and an operation bar 54 for operating the document or the like displayed in the document display area 52.

Various buttons 51a to 51g such as "original", "edited result display switching", "difference display", "download", "edit start", "next document", and "previous document" are provided in the toolbar 51. The "original" button 51a is for switching to the original document. The "edited result display switching" button 51b is a pull-down menu, and is used to select "user-edited result display" for displaying the result edited by the user, "other-edited result display" for displaying the result edited by others, "all-edited results display" for displaying the result edited by all related people, or the like. The "difference display" button 51c is for displaying a difference result. The "download" button 51d is for instructing download of the document from the document server apparatus 2. The "edit start" button 51e is for switching from the preview mode to the edit mode. The "next document" button 51f is for reading out an object to be edited from the downloaded documents. The "previous document" button 51g is for returning and displaying the previously displayed document.

In the attribute information display area 53, in addition to attribute information of a document, for example, comments, pointed out matters, reflective status of edited contents, or the like are displayed in chronological order.

The operation bar 54 is provided with various operation buttons for enabling to feed, return, reduce, enlarge, full-screen display, normal display, and the like of the document page.

Display Example 1 of Editing Layer

Figure 5A:
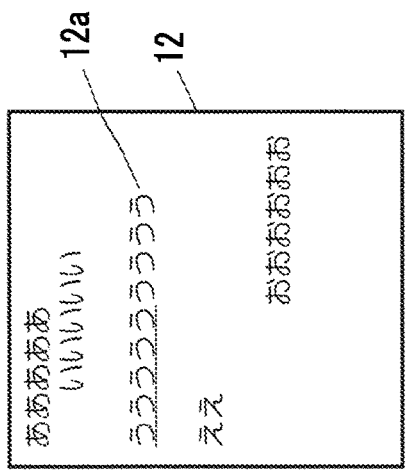
FIG. 5A is a diagram illustrating an example of an original layer.
Figure 5B:
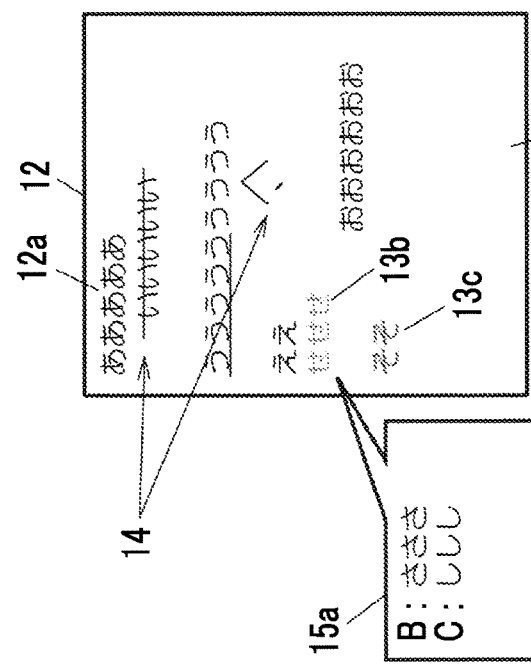
FIGS. 5B to 5D are diagrams illustrating Display Example 1 in which an editing layer is superimposed on the original layer illustrated in FIG. 5A.
Figure 5C:
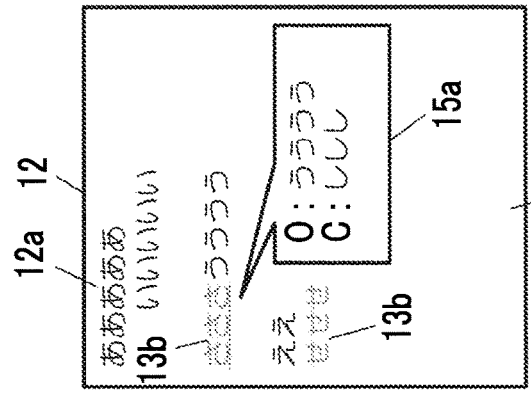
Figure 5D:
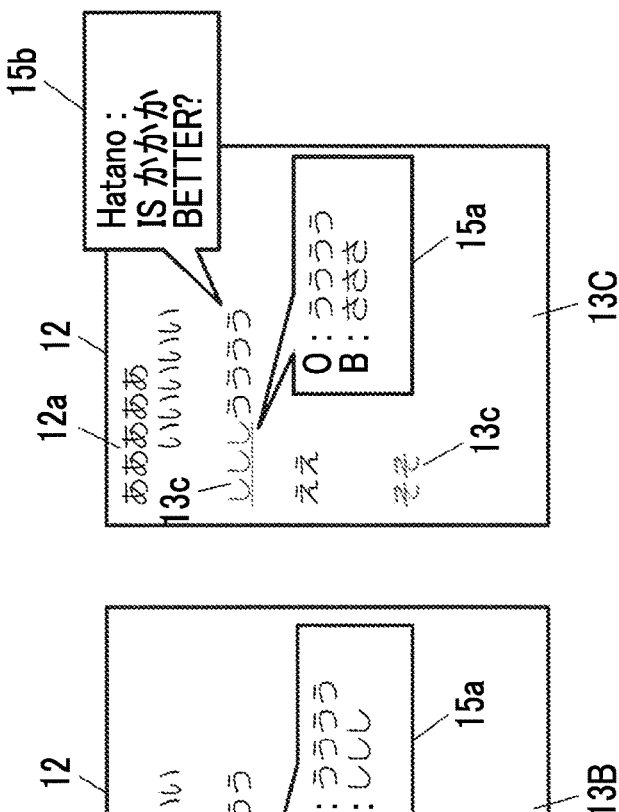

FIG. 5A is a diagram illustrating an example of the original layer 12, and FIGS. 5B to 5D are diagrams illustrating Display Example 1 in which the editing layer 13 is superimposed on the original layer 12 illustrated in FIG. 5A.

FIG. 5B shows a display example in which the editing layer 13B edited by the user B and the editing layer 13C edited by the user C are superimposed and displayed on the original layer 12. In FIG. 5B, the character string 13b of "せせせ" edited by the user B and the character string 13c of "そそ" edited by user C are displayed in different colors.

Further, in a case where deletion or insertion is performed, these marks are displayed as the proofreading notation 14. In addition, the proofreading notation 14 may be displayed in a color corresponding to the editing user.

In a case where edited parts overlap, the balloon 15a is displayed, and the edited content of the editing layer, which has not been selected as the editing layer to be superimposed and displayed, is described as a candidate notation in the balloon 15a. For example, in a case where there are respective plural editing layers 13B, 13C and one of the editing layers 13B, 13C is selected and displayed so as to be superimposed, the overlapping parts of the edited parts of the editing layers 13B, 13C, which are not selected, is described in the balloon 15a. In the case illustrated in FIG. 5B, among the described contents of the balloon 15a, "B: さささ" indicates that the user B has edited that part to "さささ", "C: しLL" indicates that the user C has edited that part to "しLL". In FIG. 5B, the balloon 15a protrudes from the editing layers 13B and 13C, but it may be designed not to protrude.

FIG. 5C shows a display example in which the editing layer 13B edited by the user B is superimposed on the original layer 12. In FIG. 5C, "さささ" and "せせせ" are character strings 13b edited by the user B. Since the edited part of "さささ" edited by the user B and the edited part of "しLL" edited by the user C match, the edited content of the editing layer 13C which is not selected as the editing layer 13 to be superimposed and displayed is described in the balloon 15a. Among the described contents of the balloon 15a, "O: うううう" indicates that the original text information 12a is "うううう".

FIG. 5D shows a display example in which the editing layer 13C edited by the user C who is not the user is superimposed on the original layer 12. In FIG. 5D, character strings 13c of "しLL" and "そそ" edited by user C is displayed. Since the edited part of "しLL" edited by the user C and the edited part edited by the user B match, the edited content "さささ" of the editing layer 13B which is not selected as the editing layer 13 to be superimposed and displayed is described in the balloon 15a. In a case where the user inputs a comment instead of editing, it is described in the balloon 15b. Among the described contents of the balloon 15b, "Hatano" means the user name who inputs a comment. In FIG. 5D, the balloon 15b protrudes from the editing layer 13C, but it may be designed not to protrude.

Display Example 2 of Editing Layer

FIGS. 6A and 6B are diagrams illustrating Display Example 2 in which the editing layer 13 is superimposed on the original layer 12 illustrated in FIG. 5A.

FIG. 6A is a diagram illustrating a display example of a difference between the editing layer 13B and the editing layer 13C. In a case where the user B edits the original character string "ううう" to a character string 13b "ささ" and edits the original character string to a character string 13b "せせせ", and the user C edits the original character string to a character string 13c "そそ", as illustrated in FIG. 6A, only a difference between the original layer 12 and the editing layer 13B may be displayed and only a difference between the original layer 12 and the editing layer 13C may be displayed. As illustrated in FIG. 5D, the balloon 15b illustrated in FIG. 6A displays comments.

FIG. 6B is a diagram illustrating a comparison display example in a case where the character string in the original layer 12 matches the edited part of the editing layer 13. The editing layer 13 is shifted by a predetermined amount (for example, one line) downward and superimposed and displayed such that the character string 120 "ううううう" in the edited part of the text information 12a of the original layer 12 and the edited character string 13b "かきくけこさしすせ" do not overlap. The shifting direction is not limited to the downward direction but may be an upward direction or a lateral direction.

Operation of Exemplary Embodiment

Next, an example of the operation of the display editing system 1 will be described. The following description will be given on the assumption that the terminal apparatus 3A is operated by the user A who is a creator of a document, the terminal apparatus 3B is operated by the user B who is an editor of the document, and the terminal apparatus 3C is operated by the user C who is an editor (for example, the superior of the user A) of the document.

1. Editing Request Process

Figure 7:
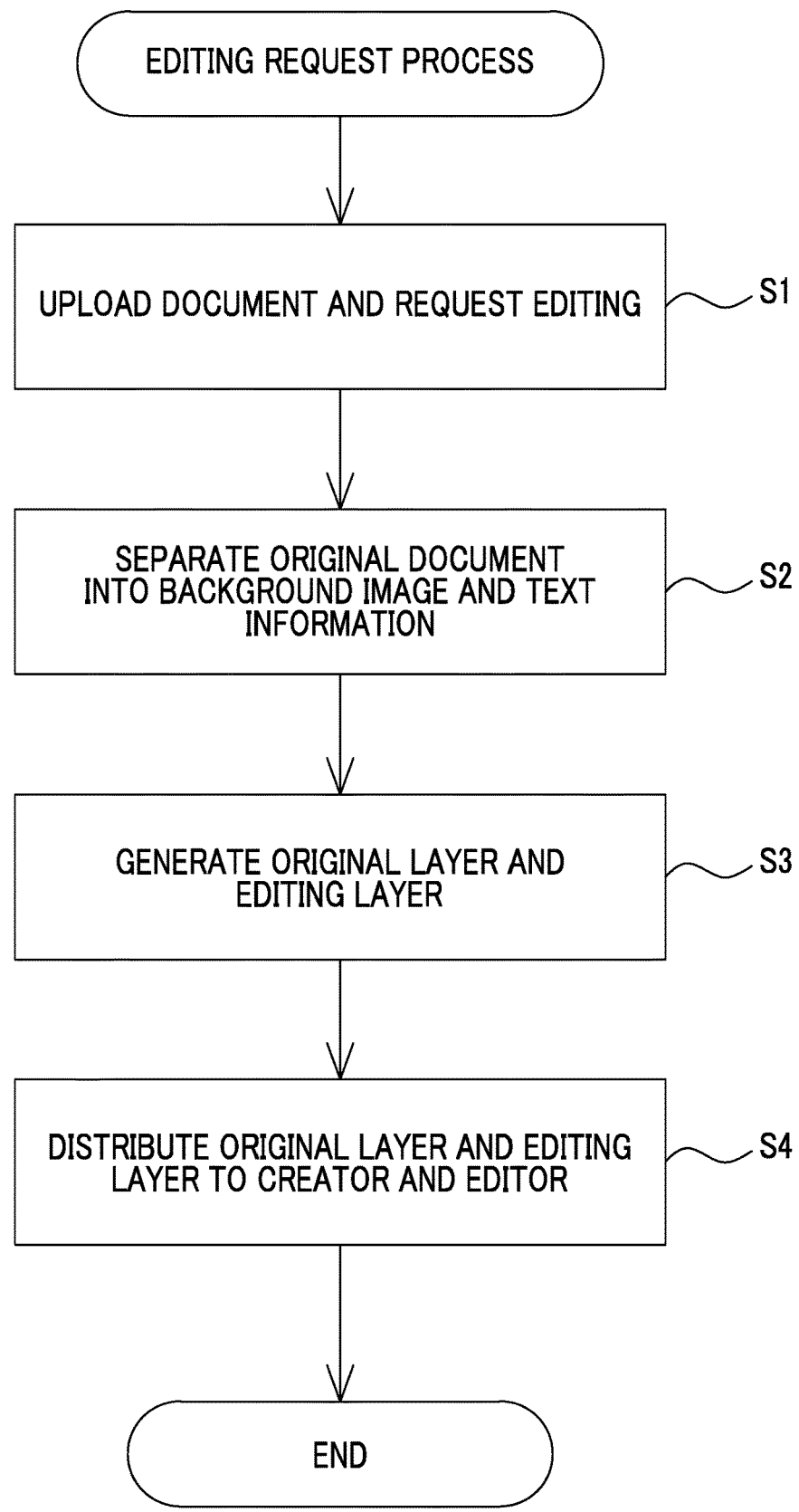
FIG. 7 is a flowchart illustrating an example of an editing request process of the display editing system.

An example of processing in a case where a creator makes an editing request will be described with reference to the flowchart of FIG. 7.

The user A who is a creator operates the terminal apparatus 3A to access the document server apparatus 2, uploads an original document 10 created by the user A, and makes an editing request while designating editors (for example, the user B, the user C) for the original document 10 (S1). The editor may be determined in advance according to the type, the creator, and the like of the original document 10. For example, the superiors of the group to which the creator belongs and approvers of the superiors may be determined in advance as editors.

The separation unit 201 of the document server apparatus 2 separates the original document 10, that has been requested for editing, into a background image 11 and text information 12a (S2). In addition, separation into the background image 11 and the text information 12a may be performed by the creator of the terminal apparatus 3A, or may be performed by the document server apparatus 2 or the terminal apparatus 3 before the editing request.

The layer generation unit 202 of the document server apparatus 2 generates plural original layers 12 including the text information 12a and plural editing layers 13 not including the text information 12a (S3). The layer generation unit 202 stores the original document 10, the background image 11, the text information 12a, the original layer 12, and the editing layer 13 in the storage section 21.

In the case of generating the original layer 12 and the editing layer 13, the layer generation unit 202 gives authority to the original layer 12 and the editing layer 13. For example, the editing layer 13B distributed to the user B may be edited only by the user B and cannot be edited by the user C, but all or part of the character string of the text information 12a in the editing layer 13B may be copied to the editing layer 13C.

The distribution unit 203 of the document server apparatus 2 distributes the original layer 12 and the editing layer 13A to the terminal apparatus 3A of the user A which is a creator, distributes the original layer 12 and the editing layer 13B to the terminal apparatus 3B of the user B which is an editor, distributes the original layer 12 and the editing layer 13C to the terminal apparatus 3C of the user C which is an editor, and makes a request for editing to the user B and the user C (S4).

2. Editing Process Without Using Edited Contents of Others

Figure 8:
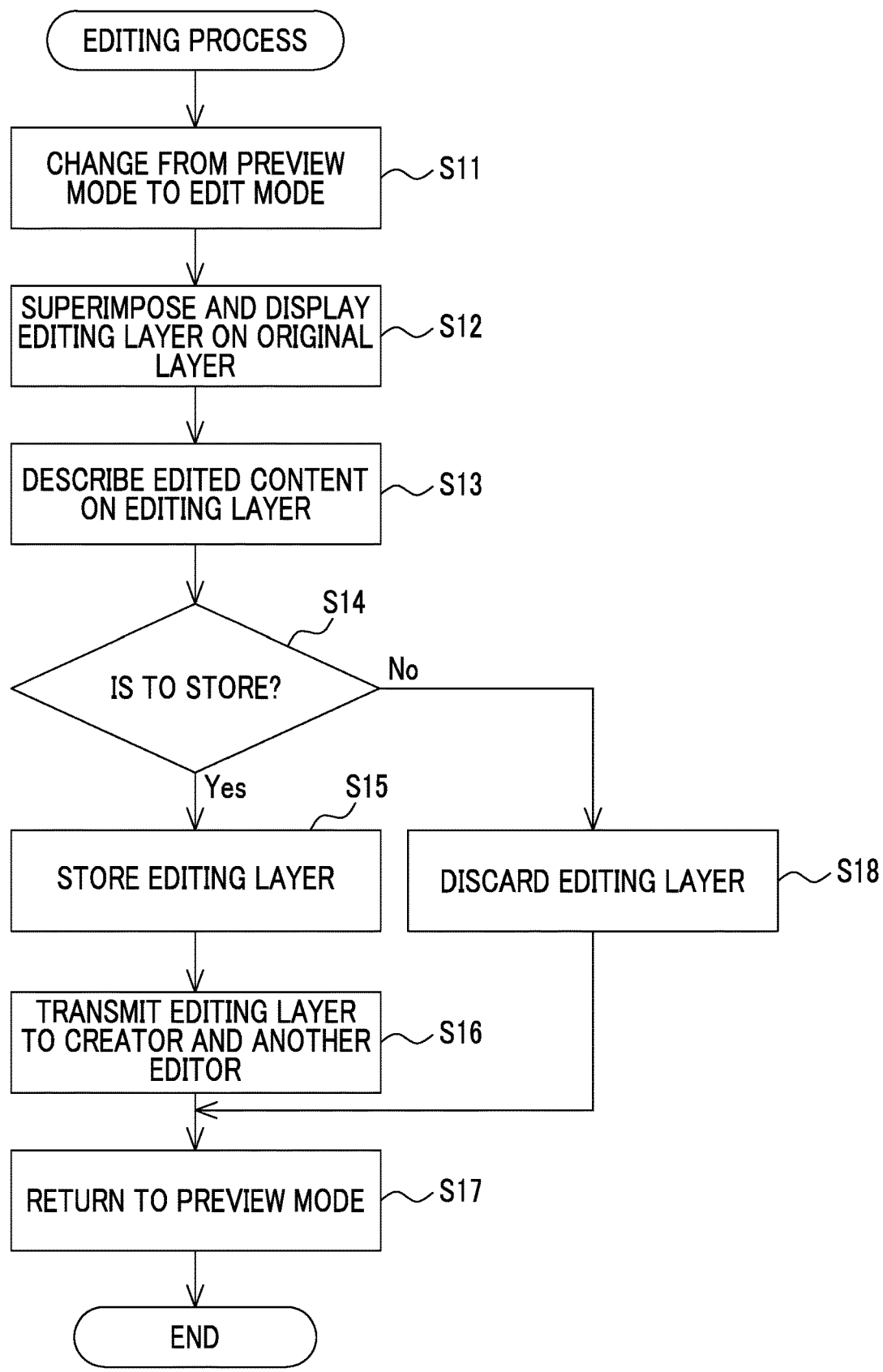
FIG. 8 is a flowchart illustrating an example of a display process of an edited result of the display editing system.

An example of processing in a case where an editor edits a document without using edited contents of others will be described with reference to the flowchart of FIG. 8. Here, a case where the user B edits a document will be described.

It is assumed that the work screen 50 is displayed on the display section 33 of the terminal apparatus 3B of the user B. The initial screen of the work screen 50 is in the preview mode. The reception unit 302 stores the original layer 12 and the editing layer 13B distributed from the document server apparatus 2, in the storage section 31. "User-edited result display" is selected from the pull-down menu by operating the "edited result display switching" button 51b. The display control unit 304 executes the display process of user-edited result.

In a case where the user B operates the "edit start" button 51e, the display control unit 304 changes the work screen 50 from the preview mode to the edit mode (S11). The display control unit 304 reads out the original layer 12 and the editing layer 13B from the storage section 31, and writes the read layers in the display memory 34 so as to superimpose the editing layer 13B on the front side of the original layer 12. The editing layer 13 is displayed in the document display area 52 of the work screen 50 in a state of being superimposed on the front side of the original layer 12 (S12).

The editing unit 303 describes the edited content on the editing layer 13B on the display memory 34 by the user B operating the input section 32 (S13). At this time, the user B is able to copy all or a part of the character string of the text information 12a included in the original layer 12 to the editing layer 13B. In a case where changing the order of sentences or adding punctuation marks, it is convenient to quote the original character string. For editing in the editing layer 13, a general-purpose text editor may be used.

The editing unit 303 determines whether or not storage of the editing layer 13B has been instructed (S14). In a case where storage has been instructed (S14: Yes), the editing unit 303 stores in the storage section 31, the editing layer 13B written in the display memory 34 (S15).

The transmission unit 301 transmits the edited editing layer 13B to the document server apparatus 2. The document server apparatus 2 stores the editing layer 13B transmitted from the terminal apparatus 3B in the storage section 21, and transmits the editing layer 13B to the terminal apparatus 3A of the user A which is a creator and the terminal apparatus 3C of the user C which is another editor (S16).

The display control unit 304 returns the work screen 50 from the edit mode to the preview mode (S17).

In the case where cancellation is selected in step S14 or in a case where an instruction to store for a certain time is not given (S14: No), the editing layer 13B is discarded (S18).

3. Editing Process Using Edited Contents of User and Others

Figure 9:
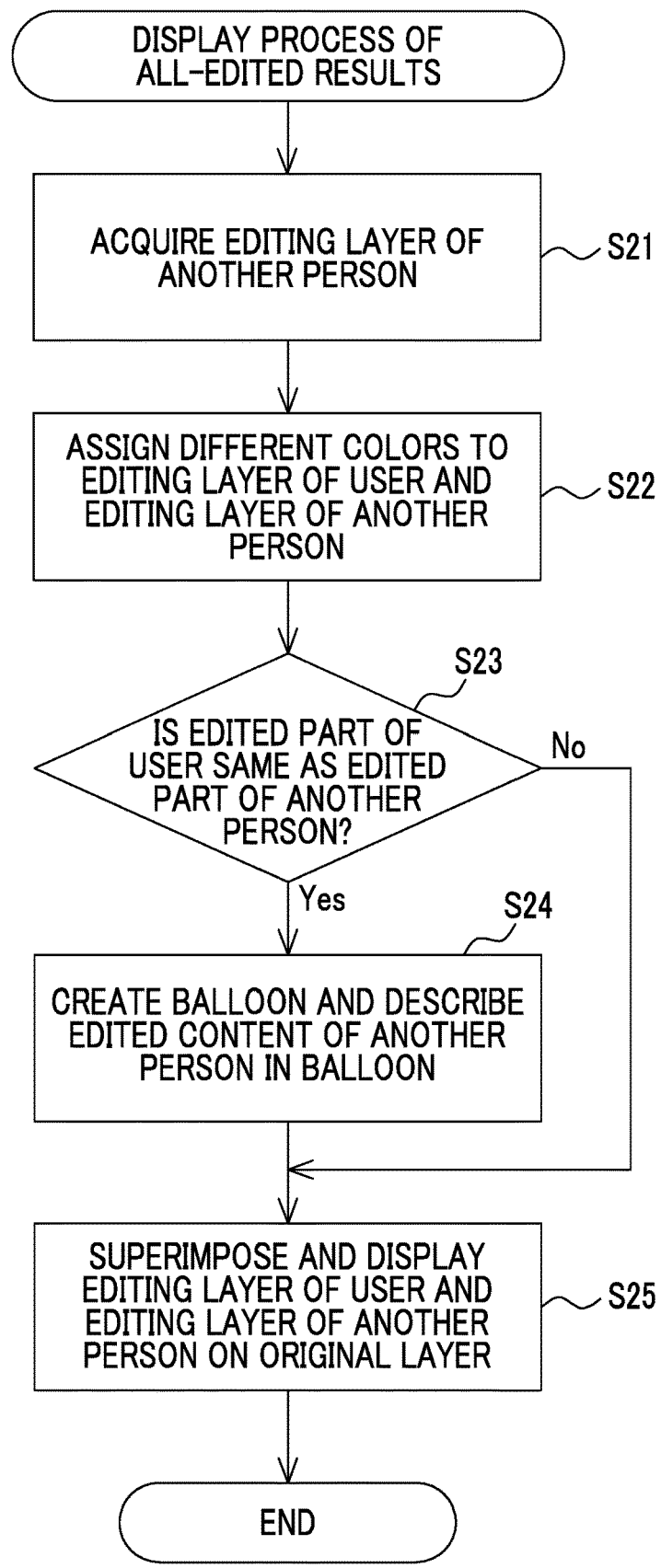
FIG. 9 is a flowchart illustrating an example of a display process of all-edited results of the display editing system.

An example of the editing process using the edited contents of the user and another person will be described with reference to the flowchart of FIG. 9. Here, a case where user C edits a document will be described.

"All-edited results display" is selected from the pull-down menu by operating the "edited result display switching" button 51b. The display control unit 304 executes the display process of all-edited results.

The terminal apparatus 3C of the user C acquires the editing layer 13B of the user B transmitted from the document server apparatus 2 and stored in the storage section 31 (S21).

The display control unit 304 assigns different colors to edited contents of the editing layer 13C and edited contents of the editing layer 13B for the user B (S22).

It is determined whether or not the edited part of the user is the same as the edited part of another person (S23). In the case where the edited parts are the same (S23: Yes), the balloon 15a is created, and edited contents of another person are described in the balloon 15a (S24).

The display control unit 304 writes the editing layer 13C and the editing layer 13B of another person so as to be superimposed on the front side of the original layer 12, in the display memory 34. The editing layer 13C is displayed in the document display area 52 of the work screen 50 in a state of being superimposed on the front side of the original layer (S25).

4. Series of Processes of Creating and Editing of Document and Reflecting

Figure 10:
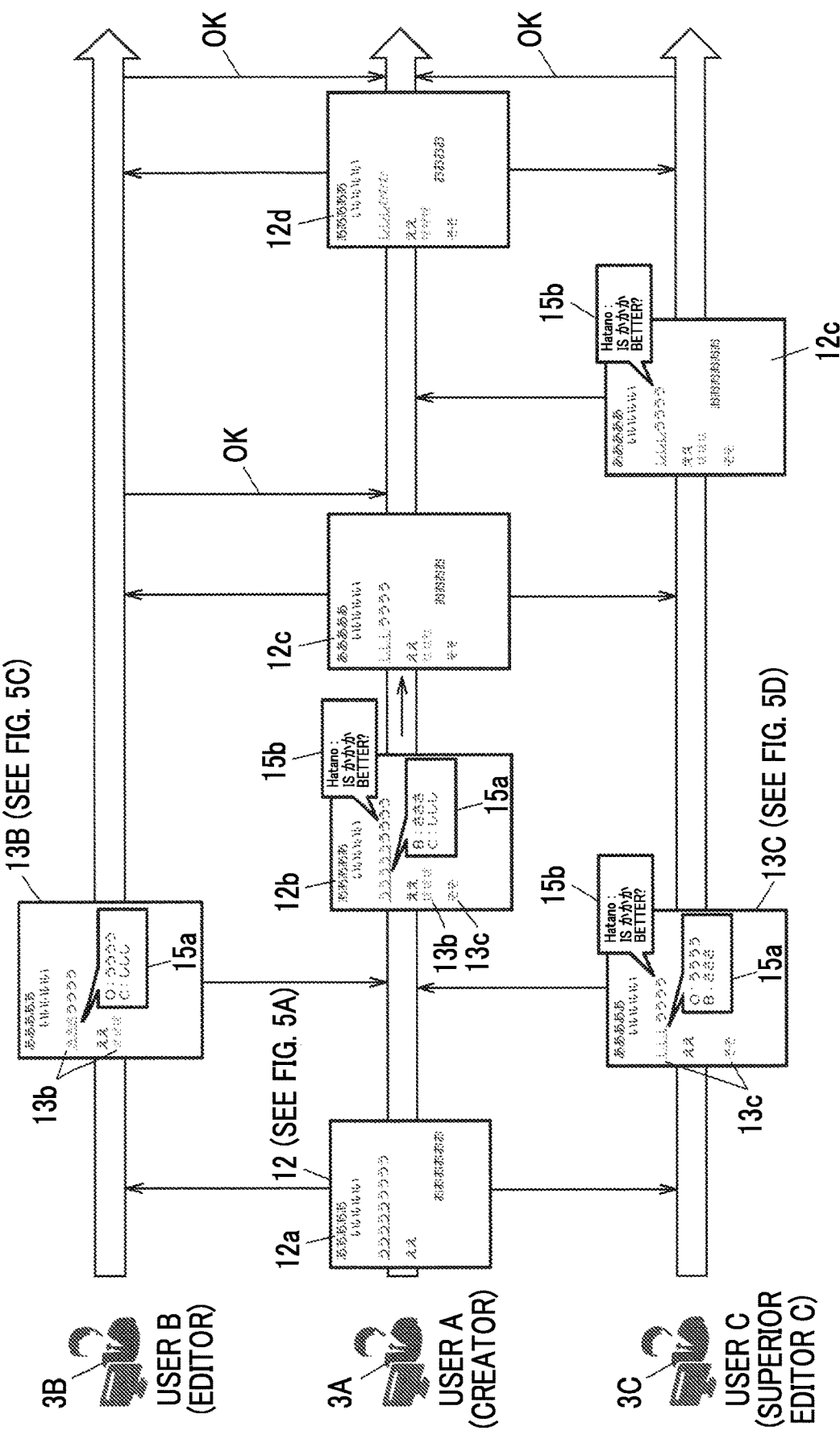
FIG. 10 is a diagram for explaining a series of processes from creating and editing of a document to reflecting edited results on the document.

FIG. 10 is a diagram for explaining a series of processes from creating and editing of a document to reflecting edited results on the document. In addition, the operation of the document server apparatus 2 will be omitted.

The original layer 12 and the editing layer 13B are distributed to the user B, and the original layer 12 and the editing layer 13C are distributed to the user C.

As illustrated in FIG. 5C, the user B displays the editing layer 13B including the edited contents of the user B so as to be superimposed on the original layer 12.

As illustrated in FIG. 5D, the user C displays the editing layer 13C including the edited contents of the user C so as to be superimposed on the original layer 12, displays the edited content of the user B in the balloon 15a, and displays the comment of the user C in the balloon 15b.

The editing layer 13B edited by the user B and the editing layer 13C edited by the user C are delivered to the user A.

The user A edits the original text information 12a with reference to the editing layer 13B by the user B and the editing layer 13C by the user C. In the case of the text information 12b illustrated in FIG. 10, "せせせせ" of the character string 13b edited by the user B and "そそ" of the character string 13c edited by the user C are reflected in the original text information 12a. For "うううう", "さささ" of editing candidate of the user B and "ししし" of editing candidate of the user C are described in the balloon 15a.

The text information 12c illustrated in FIG. 10 indicates a state where the user A edits "ううううう" to "ししし" with reference to the balloon 15a.

The original layer 12 including the text information 12c edited by the user A is distributed to the user B and the user C which are editors.

At this stage, the user B and the user C preview the original layer 12, and notifies the user A of OK in a case of determining that there is no need for editing in the contents. In a case where it is determined that editing is necessary, the user A is notified of a comment.

In the case illustrated in FIG. 10, the user B notifies the user A of OK, and the user C notifies the user A of the original layer 12 with a comment. Here, it is described in the balloon 15b as a comment that "うううう" is not edited as "かかかか".

The user A creates text information 12d in which "うううう" is edited to "かかかか", according to the comment of the user C, and distributes the original layer 12 including this text information 12d to the user B and the user C.

In a case where the user A receives a notification of OK from the user B and the user C for the text information 12d, the editing operation is ended.

Although the exemplary embodiments of the present invention have been described above, the exemplary embodiments of the present invention are not limited to the above exemplary embodiments, and various modifications and implementations are possible within the scope not changing the gist of the present invention. For example, in a case where data to be edited is image data, the original data for image data other than the character part of image data may be edited in the same way as in the exemplary embodiment.

Parts or all of the constituent elements of the control sections 20, 30 may be configured with hardware circuits such as a field programmable gate array (FPGA) and an application specific integrated circuit (ASIC).

Further, it is possible to omit or modify a part of the constituent elements of the above exemplary embodiments within the scope not changing the gist of the present invention. Further, steps may be added, deleted, changed, and exchanged in the flow of the above exemplary embodiment within the scope not changing the gist of the present invention. Further, the program used in the above exemplary embodiment may be provided by being recorded on a computer readable recording medium such as a CD-ROM. In addition, the program used in the above exemplary embodiment may be stored in an external server such as a cloud server, and may be used through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display editing apparatus comprising a processor, wherein the processor function as: a reception unit that receives a first editing layer with transparency including data to be edited, and a second editing layer with transparency including the data to be edited which is edited by a second user; a first editing unit that edits the data to be edited included in the first editing layer, based on an operation of a first user; and a display control unit that performs control such that a layer, selected from the first editing layer and the second editing layer, is superimposed and displayed on a front side of an original layer including original data to be edited before editing, wherein in a case that, from the first editing layer and the second editing layer, a part of the editing layers is selected and another part of the editing layers is not selected, if an edited part of the first editing layer and an edited part of the second editing layer match, the display control unit displays an edited content of a matched portion in the other part of the editing layers that is not selected and does not display an edited content other than the matched portion in the other part of the editing layers.

2. The display editing apparatus according to claim 1, wherein the display control unit performs control such that the editing layer is displayed in a display mode identifiable by an editor.

3. The display editing apparatus according to claim 2, wherein the display control unit performs control such that a superimposing position of the selected editing layer is shifted and displayed relative to the original layer.

4. The display editing apparatus according to claim 2, wherein in the original layer, the first editing layer, and the second editing layer, all or part of the data is capable of being pasted between the layers.

5. The display editing apparatus according to claim 1, wherein the display control unit performs control such that a difference between the original layer and the first editing layer or between the original layer and the second editing layer, which are selected, is displayed.

6. The display editing apparatus according to claim 5, wherein the display control unit performs control such that the difference is displayed in a display mode identifiable by an editor.

7. The display editing apparatus according to claim 6, wherein in a case where edited parts of a plurality of the editing layers overlap each other, the display control unit performs control such that a difference between the editing layer of one of the overlapping edited parts and the original layer is displayed in a balloon form.

8. The display editing apparatus according to claim 5, wherein in a case where edited parts of a plurality of the editing layers overlap each other, the display control unit performs control such that a difference between the editing layer of one of the overlapping edited parts and the original layer is displayed in a balloon form.

9. The display editing apparatus according to claim 5, wherein in the original layer, the first editing layer, and the second editing layer, all or part of the data is capable of being pasted between the layers.

10. The display editing apparatus according to claim 1, wherein the display control unit pertains control such that a superimposing position of the selected editing layer is shifted and displayed relative to the original layer.

11. The display editing apparatus according to claim 1, wherein in the original layer, the first editing layer, and the second editing layer, all or part of the data is capable of being pasted between the layers.

12. The display editing apparatus according to claim 1, wherein in a case where the first user has an authority to edit the original data to be edited, the first editing unit performs editing such that edited content selected from edited content by the first user and edited content by the second user is to be reflected on the original data to be edited.

13. A display editing apparatus comprising a processor, wherein the processor functions as:
a distribution unit that distributes an original layer including original data to be edited before editing and a first editing layer with transparency including the data to be edited to a first user, and distributes the original layer and a second editing layer with transparency including the data to be edited to a second user; and
a third editing unit that edits the original data to be edited, based on an operation of a third user,
wherein in a case where the original data to be edited is edited, the edited content is retained on the page, even in a case where an edited part goes to a next page.

14. The display editing apparatus according to claim 13, wherein the processor further functions as:
a reception unit that receives the first editing layer including the data to be edited which is edited by the first user, and the second editing layer including the data to be edited which is edited by the second user.

15. The display editing apparatus according to claim 14, wherein the processor further functions as:
a display control unit that performs control such that an editing layer, selected from the first editing layer and the second editing layer, is superimposed and displayed on a front side of the original layer.

16. The display editing apparatus according to claim 14, wherein the third editing unit performs editing such that edited content selected from edited content by the first user and edited content by the second user is reflected on the original data to be edited.

17. A display editing system comprising:
a display editing apparatus comprising a processor, wherein the processor functions as:
a reception unit that receives a first editing layer with transparency including data to be edited, and a second editing layer with transparency including the data to be edited which is edited by a second user;
a first editing unit that edits the data to be edited included in the first editing layer, based on an operation of a first user; and
a display control unit that performs control such that a layer, selected from the first editing layer and the second editing layer, is superimposed and displayed on a front side of an original layer including original data to be edited before editing,
wherein the display editing apparatus is operated by the first user,
the display editing system further comprises:
a display editing apparatus having a function similar to the display editing apparatus operated by the first user, that is operated by the second user;
a display editing apparatus that is operated by a third user; and
a server apparatus that is connected to the display editing apparatuses, which are respectively operated by the first user, the second user, and the third user, through a network, and distributes the original layer, the first editing layer, and the second editing layer,
wherein the display editing apparatus that is operated by the third user includes a processor, and the processor functions as:

a distribution unit that distributes the original layer and the first editing layer to the first user, and distributes the original layer and the second editing layer to the second user, and a third editing unit that edits the original data to be edited, based on an operation of the third user.

* * * * *